Aug. 2, 1938.  R. S. BEGG ET AL  2,125,266
HYDRAULIC BRAKE
Filed July 17, 1933  3 Sheets-Sheet 1
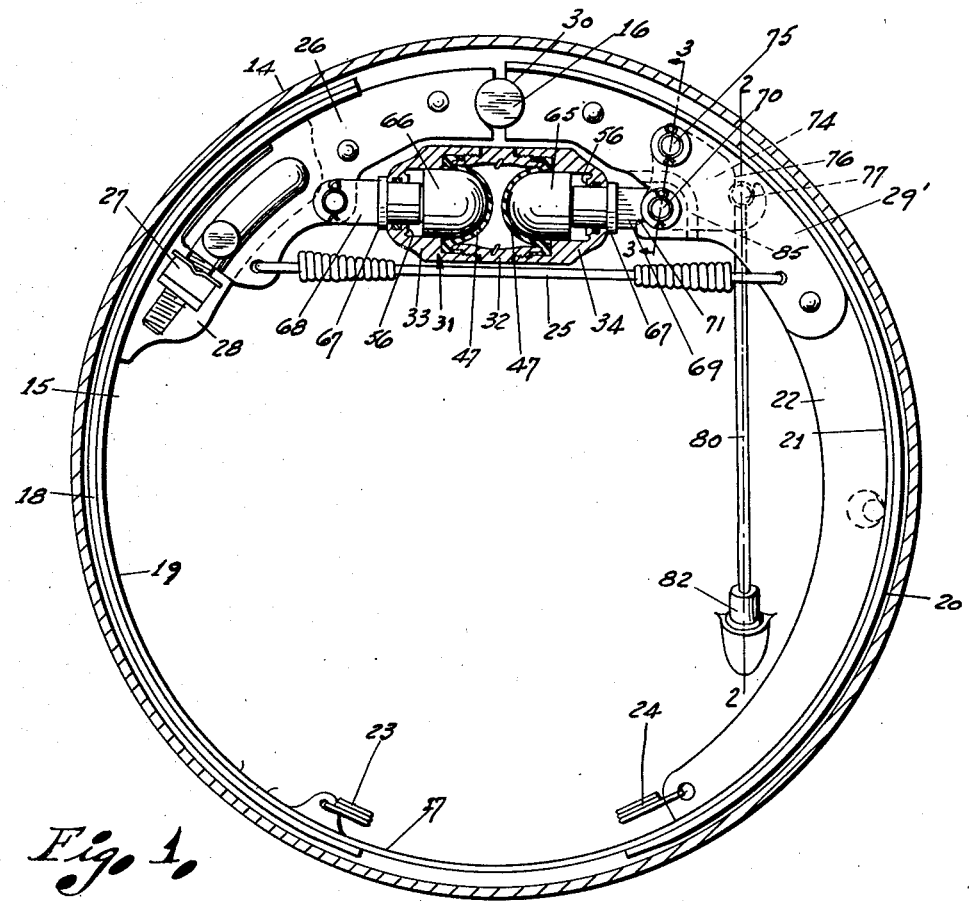
INVENTORS
RUSSELL S. BEGG &
BY GERHARD C.R. KUIPER
Louis W. Helmuth
ATTORNEY Aug. 2, 1938.   R. S. BEGG ET AL   2,125,266
HYDRAULIC BRAKE
Filed July 17, 1933   3 Sheets-Sheet 2
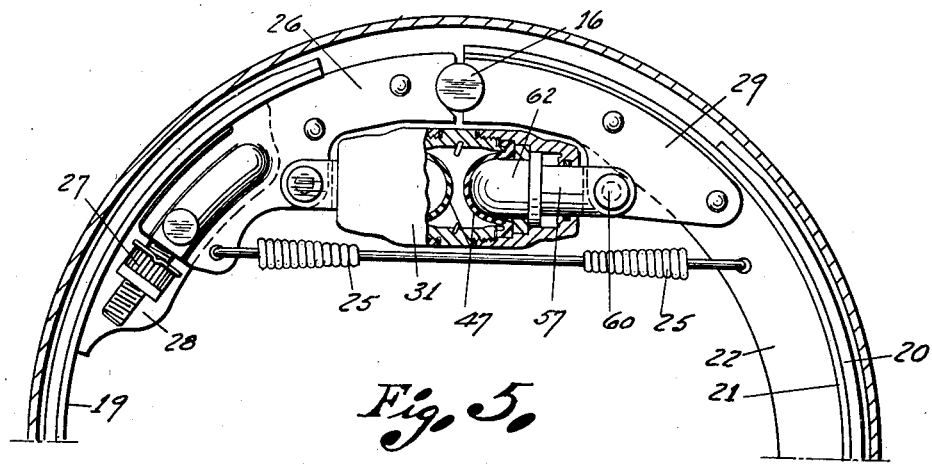
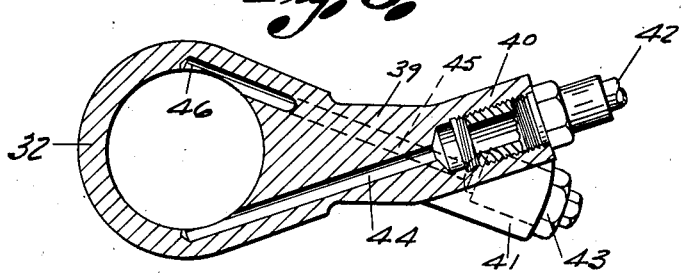
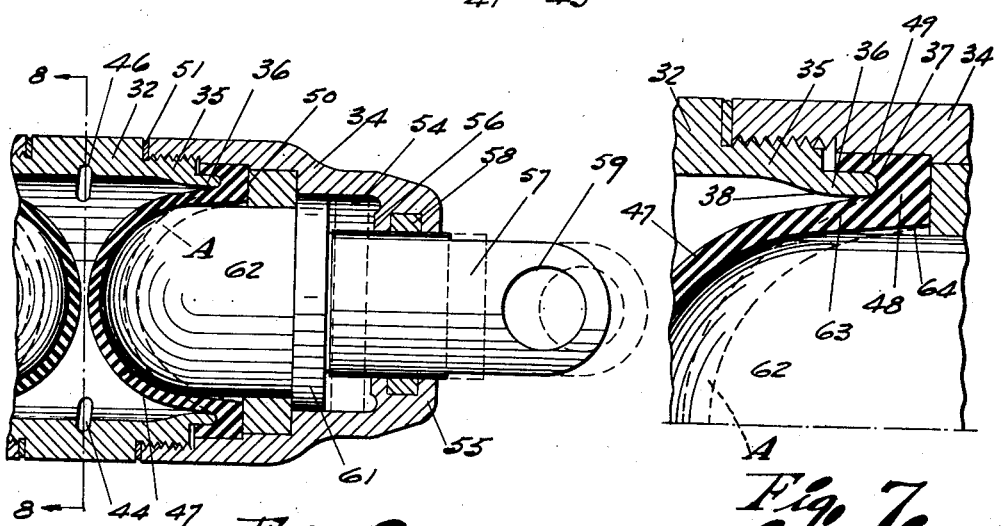
INVENTORS
RUSSELL S. BEGG &
BY GERHARD C. R. KUIPER
ATTORNEY Aug. 2, 1938.   R. S. BEGG ET AL   2,125,266
HYDRAULIC BRAKE
Filed July 17, 1933   3 Sheets-Sheet 3
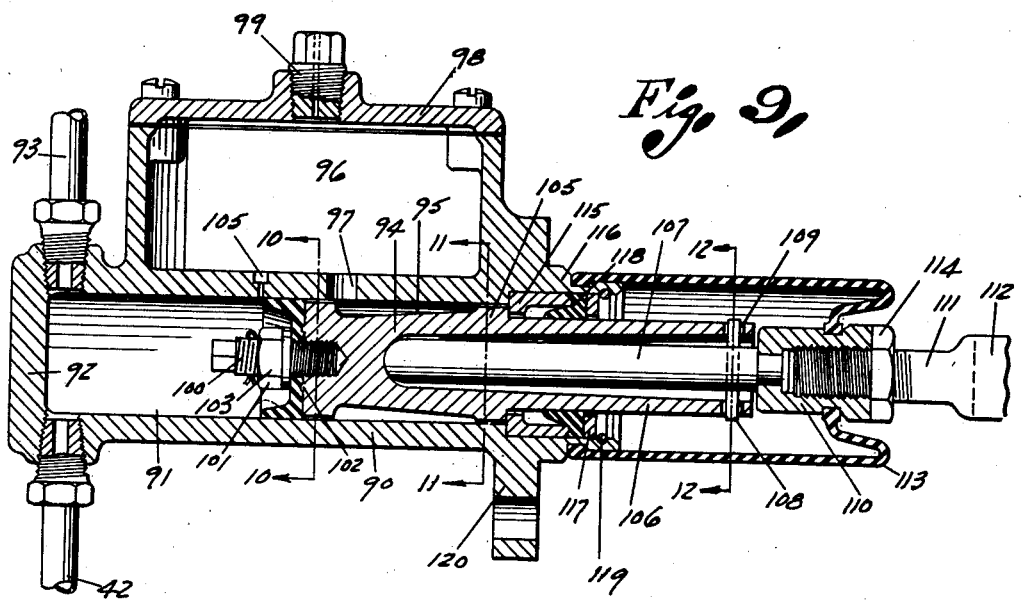
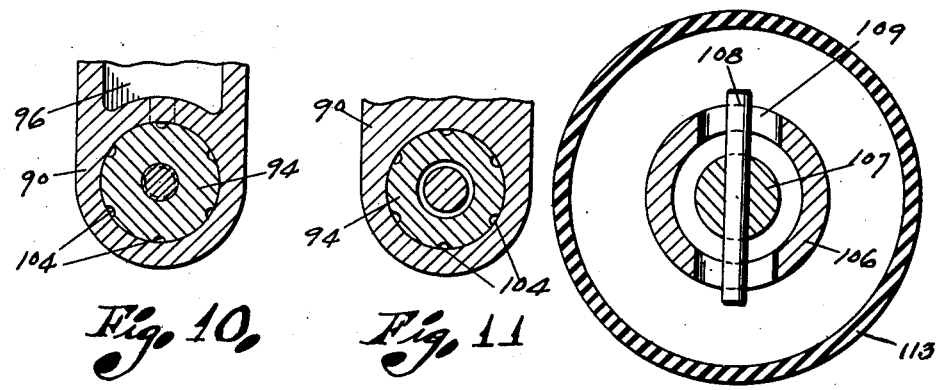
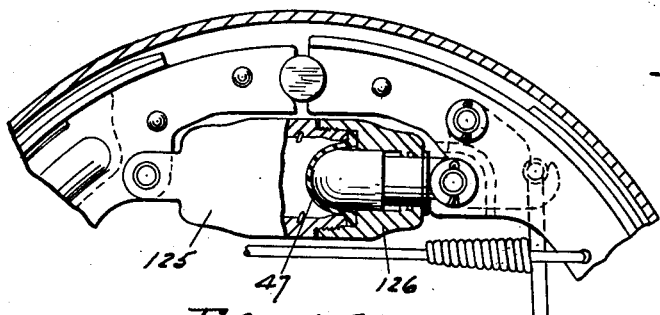
INVENTORS
RUSSELL S. BEGG &
BY GERHARD C.R. KUIPER
ATTORNEY Patented Aug. 2, 1938

2,125,266

UNITED STATES PATENT OFFICE 2,125,266

HYDRAULIC BRAKE

Russell S. Begg, Cleveland Heights, and Gerhard C. R. Kuiper, Cleveland, Ohio, assignors to The Midland Steel Products Company, Cleveland, Ohio, a corporation of Ohio Application July 17, 1933, Serial No. 680,722

11 Claims. (Cl. 188—152)

This invention relates to hydraulic brakes.

An important object of the invention is to provide a fluid pressure chamber with a normally stressed flexible force transmitting wall, which wall is moved toward normal unstressed condition during brake application.

Another important object is to provide a brake chamber construction which is instantly active under initial pressure and which is leak proof and requires no valves or other means in the system for maintaining this desirable condition of the cylinder.

Another important object of the invention is to provide in combination with a fluid pressure device for applying the brake, a mechanical device for applying the same brake and which is dependent upon the fluid pressure device to apply the brake without stressing a flexible wall of the fluid pressure device beyond its normal condition, while the fluid pressure device can apply the brake independently of the mechanical device.

A further object of the invention is to provide a device of the above character which is strong, durable and so compact that it can be easily applied to and compactly arranged relative to existing types of brake mechanism.

A still further object of the invention is to provide an improved master cylinder for transmitting pressure to wheel cylinders and which enables the construction of the master cylinder to be reduced to its simplest construction.

Other objects and advantages of the invention will become apparent during the course of the following description.

In the accompanying drawings forming a part of the application and wherein like numerals are employed to designate like parts throughout the several views.

Fig. 1 is a view showing the combined fluid pressure and mechanical brake applied to a brake shoe.

Fig. 2 is a transverse section taken on the line 2—2 of Fig. 1.

Fig. 3 is a transverse section taken on the line 3—3 of Fig. 1.

Fig. 4 is a longitudinal section taken through a modified form of cup.

Fig. 5 is a view showing a modified form of wheel cylinder which may be applied to the two front wheels without provision for mechanical actuation of the brake of a vehicle.

Fig. 6 is an enlarged longitudinal section of one end of the wheel cylinder,

Fig. 7 is an enlarged fragmentary section of a portion of the wheel cylinder and cup illustrating details of one form which the cup or flexible wall of the cylinder may assume, Fig. 8 is a transverse section of the intermediate section of a wheel cylinder when on an enlarged scale with the feed pipe and breather therefor, Fig. 9 is a longitudinal section through the master cylinder, Fig. 10 is a transverse section of the same taken on line 10—10 of Fig. 9, Fig. 11 is a transverse section taken on the line 11—11 of Fig. 9, Fig. 12 is a transverse section on an enlarged scale on the line 12—12 of Fig. 9, and, Fig. 13 is a longitudinal section of a single piston type of wheel cylinder.

Referring now in detail to the construction and particularly to Fig. 1, the numeral 14 designates a brake drum with a backing plate or apron 15 secured to an axle, not shown, for closing the open side of the drum. An anchor pin 16 fixed to the apron takes the braking torque from either end of a one piece, full floating, self energizing brake band or shoe 17. This brake band is provided with a section of brake lining 18 on its more flexible half 19 and a section of brake lining 20 on its more rigid or served portion or half 21. This portion 21 of the floating band is made more rigid by the provision of a radially extending rib 22. This band is resiliently connected to the backing plate by means of centering springs 23 and 24 as shown or in any other suitable manner and the free ends of the band are retained in proper relation to the anchor 16 by means of the brake retractor spring or springs 25 connecting the ends of the band adjacent the end which cooperates with the anchor 16. The flexible end 19 of the band is provided with an adjuster 26 which forms the contact with the anchor pin for the more flexible end of the band, and this adjuster may be moved relative to the end by means of adjuster mechanism 27. This adjuster 26 is illustrated as straddling a radial rib 28 provided at the flexible end of the band. A bracket plate 29' is rigidly fastened to the radial rib 22 of the rigid side and has its free end provided with an arcuate surface 30 in the same manner as the free end of the adjuster 26 for contact with the anchor pin 16.

A fluid pressure device or wheel cylinder indicated generally by the numeral 31 is suspended on the free ends of the brake band and is preferably arranged between the anchor and the brake release spring or springs 25.

This brake cylinder in the present illustration is composed of three separable sections, a central section 32 and two end sections 33 and 34 respectively. The central section 32 is cylindrical and as best seen in Figs. 6 and 7 has opposite ends provided with reduced externally threaded axial extensions 35 each of which terminates in a reduced radially extending annular flange 36, the outer free end of which is formed on a true radius 37 as illustrated for a purpose which will presently appear. As best seen in Fig. 7, the radius of the inner surfaces of the flanges 36 are smaller than the radius of the bore through the section 32 and the bore gradually tapers from this radius to the radius of the bore as indicated at 38.

The central section 32, as shown more clearly in Fig. 8 is provided with a lateral integral extension 39 having a diameter much smaller than that of the cylinder for projection through a grommet and opening in the backing plate permitting the cylinder to shift with the band. The end of this extension terminates in two angled extensions 40 and 41, the former being connected to the liquid feed pipe from a master cylinder and the latter having an air bleeder attachment 43. A passage 44 extends through the nipple 40, extension 39 and communicates with the bore of the cylinder at its lower end, while a passage 45 extends through nipple 41 and angularly upwardly to communicate with the top of the intermediate section as at 46. Both of the passages 44 and 45 communicate with the bore of intermediate section 32 at substantially equal distances from the ends of this section. One or more flexible end walls are provided for each wheel cylinder 31 in the form of rubber cups 47 extending axially into the bore of the central section 32 and having a laterally extending lip 48. The lip of each cup is rigidly clamped between shoulders of the central and end sections of the cylinder as illustrated. The cup shown in Figs. 1, 5, 6 and 7 has its lip provided with an axially extending annular flange 49 which is spaced from the body of the cup to define an annular groove into which extends the annular flange 36 of the intermediate section 32. The lip 48 of this form of cup is clamped between an annular shoulder 50 formed by a separate ring inside of each end section and the rounded edges of the annular flange 36 when the threaded inner end of each end section is screwed on to the threaded flanges 35 of the midsection with a sealing gasket 51 interposed between complementary shoulders on the sections.

In the form of cup illustrated in Fig. 4, the lip 48' is not provided with the extra flange 49 and is clamped between a shoulder 53 of section 34' and the reduced threaded extension 36' of the central section 32'. Of course various forms of cups and lips may be provided without departing from the scope of the invention.

Each end section outwardly from its cup clamping shoulder is formed with a bore 54 terminating in a reduced outer end 55, thereby forming the bore with a stop shoulder 56 for the purpose of limiting the outward stroke of a piston stem 57. This stem is slidably mounted in the reduced or restricted portion of the bore and a suitable packing ring 58 engages the stem to exclude foreign material from entering into the piston bore 54 and to serve as a secondary seal should any defect develop in the cup. The outer end of each piston stem is bifurcated and provided with an aperture 59 adapted to receive a pin 60 which passes through spaced ears or brackets 29 of the band, for pivotally connecting the stem with its respective end of the brake band.

The form of piston shown in Figs. 5 and 6 is provided with an enlarged intermediate portion 61 slidably mounted in bore 54 and is adapted to engage the stop shoulder 56 for limiting the outward stroke of the piston and to engage the shoulder 50 to limit its inward travel. The nose of piston 62 is here shown as being in the form of a true hemisphere but of course they may assume whatever shape the cup 47 assumes so that the latter for the greater part of its area fits snugly over the head of the piston.

The hemispherical cup 47 here shown is made of rubber and the major portion of its dome is of substantially uniform wall thickness. This uniform wall thickness may extend all the way to the lip 48 but in some instances it has been found advantageous to have the wall thickness of the dome to gradually increase in the region 63 adjacent the lip and adjacent the tapering portion 38 of the intermediate section. In some instances it has also been found desirable to relieve the inner wall of the dome and lip 48 so that this wall slightly flares outwardly toward the end of the cylinder and provides a clearance space 64 between the piston 62 and lip of the cup.

The pistons 65 and 66 in Fig. 1 are of slightly different construction than those just described. The head of each of these pistons cooperates in the same way with the rubber cups 47 as above described, with the clearance space 64 provided. However, the piston stem of each piston 55 and 56 is provided with a removable collar 67 outwardly and exteriorly of the end of the wheel cylinder to abut the same and limit inward movement of the piston and also to relieve the cups of stress, when the parking or emergency brake, to be presently described, is brought into operation. The outward stroke of these pistons is limited by the enlarged heads of the pistons abutting stop shoulders 56. The piston stem 68 of the piston 66 has its outer end bifurcated and apertured to straddle an ear of adjuster 26 and a pin is passed therethrough for pivotally connecting it to the more flexible side of the band. The piston stem 69 of piston 65 is provided with an aperture at its outer end to receive a removable pivot pin 70. The radial rib 22 of the rigid side of the band has riveted to the opposite sides thereof a pair of bracket plates 29' the inner margins of which are provided with slots or notches 71 to receive the pin 70 with the outer end of the piston stem straddled by the bracket plates 29'. A washer 72 is positioned on the pin to overlap the edges of the notch 71 and a cotter pin 73 retains the washer and pin 70 in place. Between the apron 15 and the inside bracket plate 29' a bell crank lever 74 is fulcrumed on a pin 75 which also passes through both bracket plates 29' and the reinforcing rib 22 of this shoe. The washer is disposed on the outer side of a bracket plate 29 and a cotter pin retains the washer and pin in place.

One arm of the bell crank is pivotally connected to pin 70 while its other arm is provided with a hook 76 for the reception of a transverse pin 77 carried by a U-shaped clip 78, as better seen in Fig. 2, which clip is swively connected to an end fitting 79 rigidly connected to a flexible cable 80 which passes over a raised portion 81 of the brake apron and then through a fitting 82 having a tapered bore 83. This fitting 82 is suitably secured in an angled opening through the apron 15 and forms a connection for one end of the usual flexible conduit 84 which guides the flexible cable 80 to a suitable hand or foot brake operating mechanism. If desired, a suitable bridge piece 85 may be provided and welded between the two bracket pieces 29' surrounding the notches 71 for reinforcing the portions of the bracket which receive thrust from the piston 65.

With further reference to the cup 47 which forms an important part of this invention it will be noted in Figs. 6 and 7 that the dotted line A position of the rubber cup represents its normal unstressed or unstretched condition in brake applying position. In other words, when an increased quantity of liquid or fluid medium is admitted into the brake cylinder between both cups through the passage 44, pressure is exerted on the cups and pistons moving them outwardly toward opposite ends of the wheel cylinder to the dotted line position shown in Fig. 6 to apply the brake. The head of each piston can be suitably lubricated or the nose of each piston may be polished or formed from a metal incorporating a lubricant such as graphite or otherwise to minimize any tendencies for the inner surfaces of the cup to scuff or chafe. The collar 61 of Fig. 6, or the enlarged head of the piston in Fig. 1 engaging the stop shoulder 56 will limit outward movement of the piston.

Upon release of the brakes and reduction of the fluid pressure in the bore or chamber of midsection 32, the brake release springs 25 will move the ends of the band toward each other and will also move the pistons inwardly of the brake cylinder and stretch or distend the cup uniformly to the full line position illustrated in the drawings. From the foregoing it will be obvious that the mode of operation of the resilient cup is in effect reversed so that the cup is stressed most in brake release position under lower pressure than when in brake applying position, the fibers of the cup are not stressed to the extent they would be, if, in addition to the increased pressure, the cups would have to stand the stretching action as well. At the same time, it will be noted that the cups are free from being reversely bent during all of their movements so as not to unduly stress the fiber of the rubber cup.

When it is desired to apply the brake without exercising the fluid pressure medium, the cable 80 is pulled causing the bell crank 74 to fulcrum on pivot pin 75 and move piston stem 69 toward the left of Fig. 1 thereby causing an abutment of collar 67 with the right hand end of the wheel cylinder. This moves the wheel cylinder bodily toward the left of the figure to abut stop collar 67 on piston stem 68, and the latter being pivotally connected to the more flexible side of the band moves it into engagement with the drum for a mechanical application. The brake retractor spring 25 will return the band and cylinder to normal position and will consequently move the piston stem 69 with pin 70 until the latter bottoms in slot 71, ready for a hydraulic operation. When the brake is applied hydraulically, the pin 70 bottoms in the slot 71 of the more rigid side of the shoe and this causes the flexible side of the band to move out into engagement with the drum and become energized to move the more rigid side of the band uniformly into engagement with the drum with little or no consequent movement of the bell crank 74, but only a slight shifting of angularity of the stretch of cable 80 between the fitting 82 and the bell crank.

A form of master cylinder constituting a part of the closed system is illustrated in Figs. 9 to 12 inclusive but obviously other forms of master cylinders may be adopted. This master cylinder is designated by the numeral 90 having a bore 91 terminating in a closed end 92 with lateral pipe connections 42 and 93, one leading to the rear brakes and the other to the front brakes, or each of these pipes may be provided with branches one leading to each brake cylinder. A piston 94 is reciprocably mounted in the bore of the master cylinder and has a reduced intermediate portion 95 which is at all times in communication with a liquid reservoir 96 through a port 97. This reservoir is provided with a removable cover 98 having therein a removable combined vent and filling plug 99.

The forward end of the piston 94 has threaded therein one end of a stud 100 which projects a substantial distance forwardly of the piston and constitutes a stop engaging the forward wall of the master cylinder for limiting forward brake applying movement of the piston. A rubber cup 101 having a central aperture to be received on the stud 100 is fitted against the forward end of the piston which has small buttons or nibs 102 for indenting the cup and assisting in preventing its movement relative to the piston. In order to further hold the rubber cup against the end of the piston, a washer and a castellated nut 103 are threaded on stud 100 and back against the outer face of the rubber cup.

In order to permit passage of oil from one side to the other of the enlarged portions of the pistons, the peripheries of these enlarged portions are provided with grooves 104. These grooves on the forward end of the piston permit oil to pass the same and slightly deflect the rubber cup 101 and pass ahead of the piston to replenish the oil in front of the piston, during its back stroke. A small passage 105 is provided permitting oil to flow from the reservoir into the bore of the master cylinder. This latter passage is arranged just in advance of the skirt of the rubber cup 101 when the piston 94 is in its fully retracted position so as to permit oil from the reservoir to compensate for any losses of oil ahead of the piston.

The piston extends rearwardly of the second enlargement 105 in the form of a tube 106, having a deep cone shaped cavity extending substantially to the midsection of the main body of piston 94 to terminate there in an arcuate bottom as illustrated. A piston rod 107 extends into this axial conical cavity in the piston to bottom therein on the forward stroke of the piston. This rod is provided with a transverse pin 108 to extend at opposite ends through diametrically disposed slots 109 provided in the tubular end of the piston. These slots as shown in Fig. 12 are elongated circumferentially and also have clearance with the pin 108 lengthwise of the piston so that if the piston does not automatically return to normal brake release position, the pin will bottom in the slots and positively move the piston rearwardly.

The rear end of the rod 107 has swivelly connected thereto a threaded socket 110 for the reception of the threaded end 111 of a link 112 which may be connected to the cross shaft or brake pedal of the motor vehicle. The swiveled coupling 110 is provided intermediate its ends with an annular groove for the reception of a bead on the slack end of a tubular boot 113, the opposite end of the boot being beaded and received in an annular groove of an extension of the master cylinder. A lock nut 114 is threaded on shank 111 to abut the swiveled coupling to maintain any adjustments made between the link 112 and rod 107.

In order to limit retractile movement of the piston, a sleeve 115 is fitted within the extension 116 of the master cylinder and is provided with an annular inwardly extending flange for abutment with the rear enlargement 105 of the piston. Between the outer ends of the sleeve and a metallic collar 117 is disposed a rubber gasket 118 which is provided with a conical axially extending portion to snugly receive the tubular end of the piston and create a liquid tight seal. This collar 117 is releasably retained in firm engagement with the rubber gasket by means of a split locking ring 119 seated in an annular groove in an enlargement 116 of the master cylinder. This master cylinder may have an integral lug formed thereon for attachment of the master cylinder to a fixed part of the motor vehicle.

It will be understood that various changes in the shape, size and arrangement of parts may be resorted to without departing from the scope of the appended claims.

We claim:

1. A brake comprising a drum, a friction device engageable with the same, a pair of applying devices for engaging the friction device with the drum, separate operating means for operating each applying device, one of said applying devices being dependent upon the other and being bodily movable for engaging the friction device with the drum, and the other applying device being independent of the first mentioned applying device for engaging the friction device with the drum.

2. A brake comprising a drum, a friction device engageable with the same, fluid pressure and mechanical applying devices for engaging the friction device with the drum, said mechanical applying device being dependent upon the bodily movement of the fluid pressure device for engaging the friction device with the drum, and the fluid pressure applying device being independent of the mechanical applying device for engaging the friction device with the drum.

3. A brake comprising a drum, a friction device engageable with the same, a fluid pressure cylinder carried by the friction device and including a piston having abutment with the cylinder in one of its positions, said piston also engaging the friction device for engaging the same with the drum, and means mounted on said friction device for moving the cylinder and piston in unison to engage the friction device with the drum.

4. A brake comprising a drum, a friction device engageable with the same, a fluid pressure cylinder carried by the friction device and including a piston having abutment with the cylinder in one of its positions, said piston also normally engaging the friction device for engaging the same with the drum, and a lever fulcrumed on the friction device and normally engaging said piston, said lever being movable to move the cylinder and piston in unison and relative to a part of the friction device for engaging the latter with the drum.

5. A brake comprising a drum, a friction device engageable with the same, a fluid pressure cylinder carried by the friction device and including a piston having abutment with the cylinder in one of its positions, said piston also normally engaging the friction device for engaging the latter with the drum, and a lever fulcrumed on the friction device and pivotally connected to said piston, said lever being movable to move the cylinder and piston in unison and relative to a part of the friction device for engaging the latter with the drum.

6. A brake comprising a drum, a friction device, retractor means for normally retracting the friction device to brake release position, means for engaging the device with said drum including a brake chamber adapted to receive a fluid medium, a wall of said chamber comprising a resilient member normally stretched by the action of the retractor means and adapted to be moved toward normal unstretched condition under pressure of the fluid medium upon brake application, and means engageable with the member and preventing reverse bending thereof during brake application.

7. A brake comprising a drum, a friction device, means for engaging the friction device with said drum including a brake chamber adapted to receive a fluid medium and having a piston, retractor means for normally retaining the piston in brake release position, a substantially hemispherical resilient cup secured in said chamber and engaging said piston and being normally stretched by said retractor means in brake release position and said cup being adapted to be restored to substantially normal unstretched condition under pressure of the fluid medium upon brake application, and means on said piston for preventing reverse bending of the cup.

8. A brake comprising a drum, a friction device, means for engaging the friction device with said drum including a brake chamber adapted to receive a fluid medium and having a piston head and a stem, said chamber having an end wall through which said stem slides, a liquid tight seal between said stem and wall, said wall forming an abutment for said piston head to limit its outward stroke, retractor means for normally retaining the piston in brake release position, and another wall of said chamber comprising a diaphragm engaging substantially the entire working face of the piston and being normally distended by said retractor means in brake release position and adapted to be moved toward normal unstretched condition under the pressure of the fluid medium upon brake application.

9. A brake chamber adapted to receive a fluid medium, a hemispherical rubber cup-shaped diaphragm fixed in the chamber and closing the same and adapted to be flexed in the same direction in brake release and brake applied positions, the hemispherical portion of said diaphragm being spaced from the walls of the chamber and defining an acute angle with respect thereto, a piston having a head filling said cup-shaped diaphragm to be moved thereby, and the portions of the diaphragm adjacent its base being movable inwardly toward the piston and away from the chamber walls upon pressure being exerted upon the diaphragm by the fluid medium.

10. A brake chamber adapted to receive a fluid medium, a hemispherical rubber cup-shaped diaphragm fixed in the chamber and closing the same and adapted to be flexed in the same direction in brake release and brake applied positions, the hemispherical portion of said diaphragm being spaced from the walls of the chamber and defining an acute angle with respect thereto, a piston having a head filling said cup-shaped diaphragm to be moved thereby, and the inner surface of the diaphragm adjacent its base being relieved permitting movement of the base of the cup diaphragm toward the piston to move the entire side wall of the cup entirely out of contact with the chamber walls upon pressure being exerted upon the diaphragm by the fluid medium.

11. A brake comprising a drum, a friction device engageable with the same, means for returning said friction device from brake applying position to brake release position, a fluid pressure brake chamber having a transversely disposed rubber wall secured to the same in fluid tight relation, a piston engaging said wall and said friction device, said wall being normally urged in one direction by said friction device to retain the rubber wall in stretched position, said fluid pressure acting on said wall and said piston for moving the piston to brake applied position upon admission of fluid pressure to said chamber, and said piston having a pair of spaced shoulders engageable with the chamber for limiting the stroke of said piston in both directions of its movement.

RUSSELL S. BEGG.
GERHARD C. R. KUIPER.